July 7, 1942. W. O. HANSEN ET AL 2,289,267
ASSEMBLY MACHINE FOR FASTENING DEVICES
Filed Aug. 13, 1938 7 Sheets-Sheet 1

INVENTORS
WILLIAM O. HANSEN
THEODORE W. SWANSON
BY Roland C. Rehm
ATTORNEY

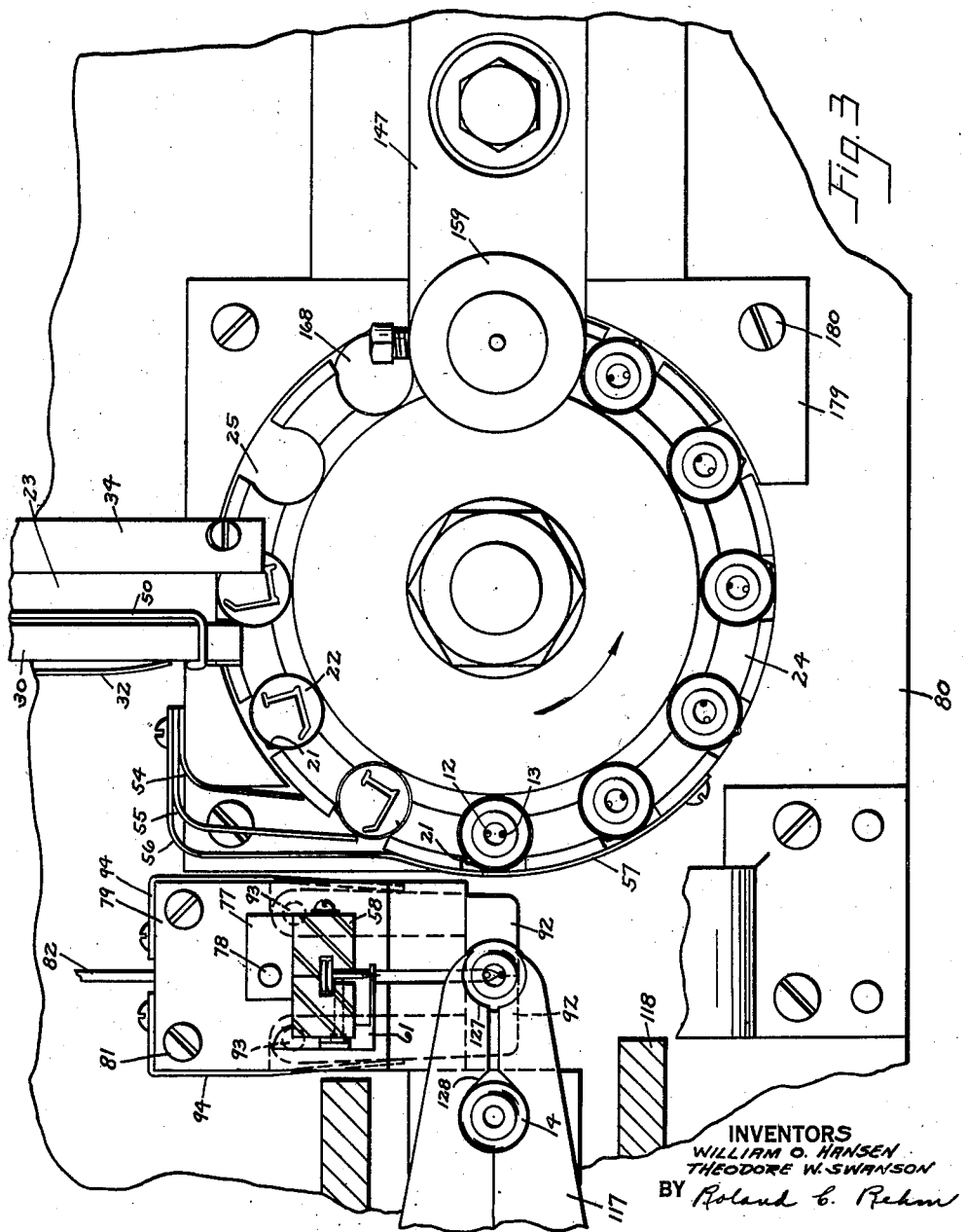

July 7, 1942.　　W. O. HANSEN ET AL　　2,289,267
ASSEMBLY MACHINE FOR FASTENING DEVICES
Filed Aug. 13, 1938　　7 Sheets-Sheet 4
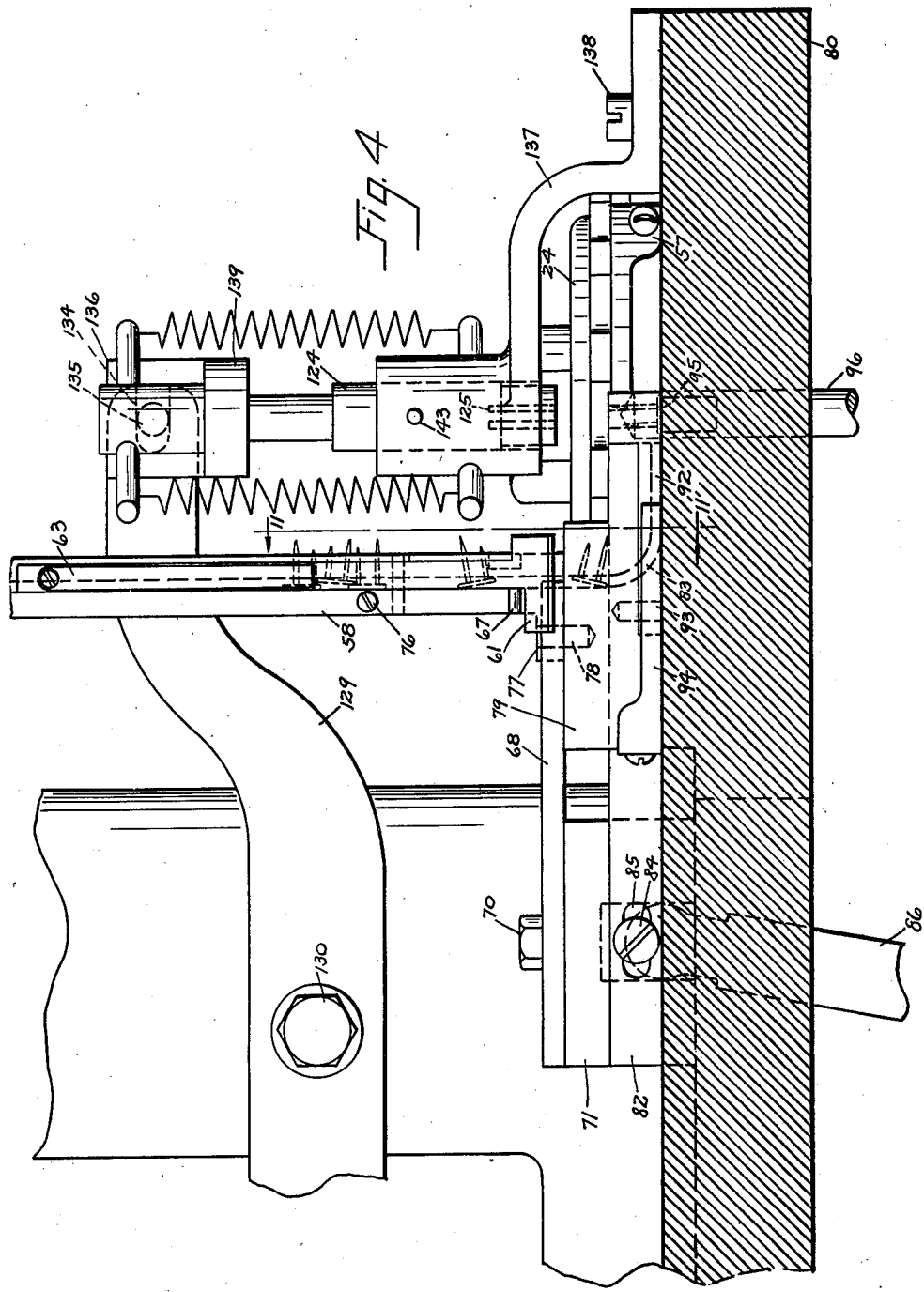
INVENTORS
WILLIAM O. HANSEN
THEODORE W. SWANSON
BY
Roland C. Behm
ATTORNEY.

July 7, 1942.  W. O. HANSEN ET AL  2,289,267
ASSEMBLY MACHINE FOR FASTENING DEVICES
Filed Aug. 13, 1938   7 Sheets-Sheet 5
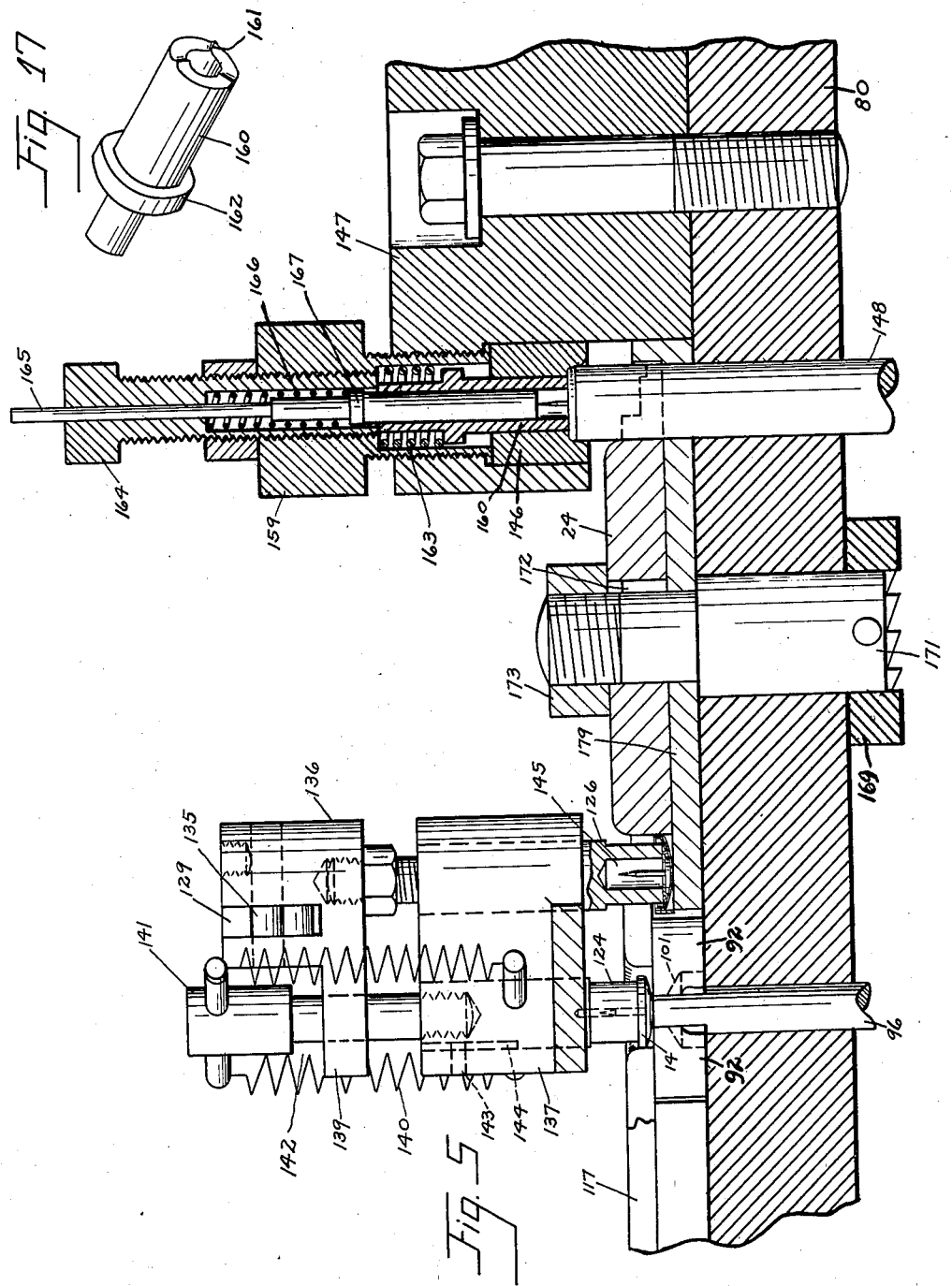
INVENTORS
WILLIAM O. HANSEN
THEODORE W. SWANSON
BY Roland C. Behm
ATTORNEY

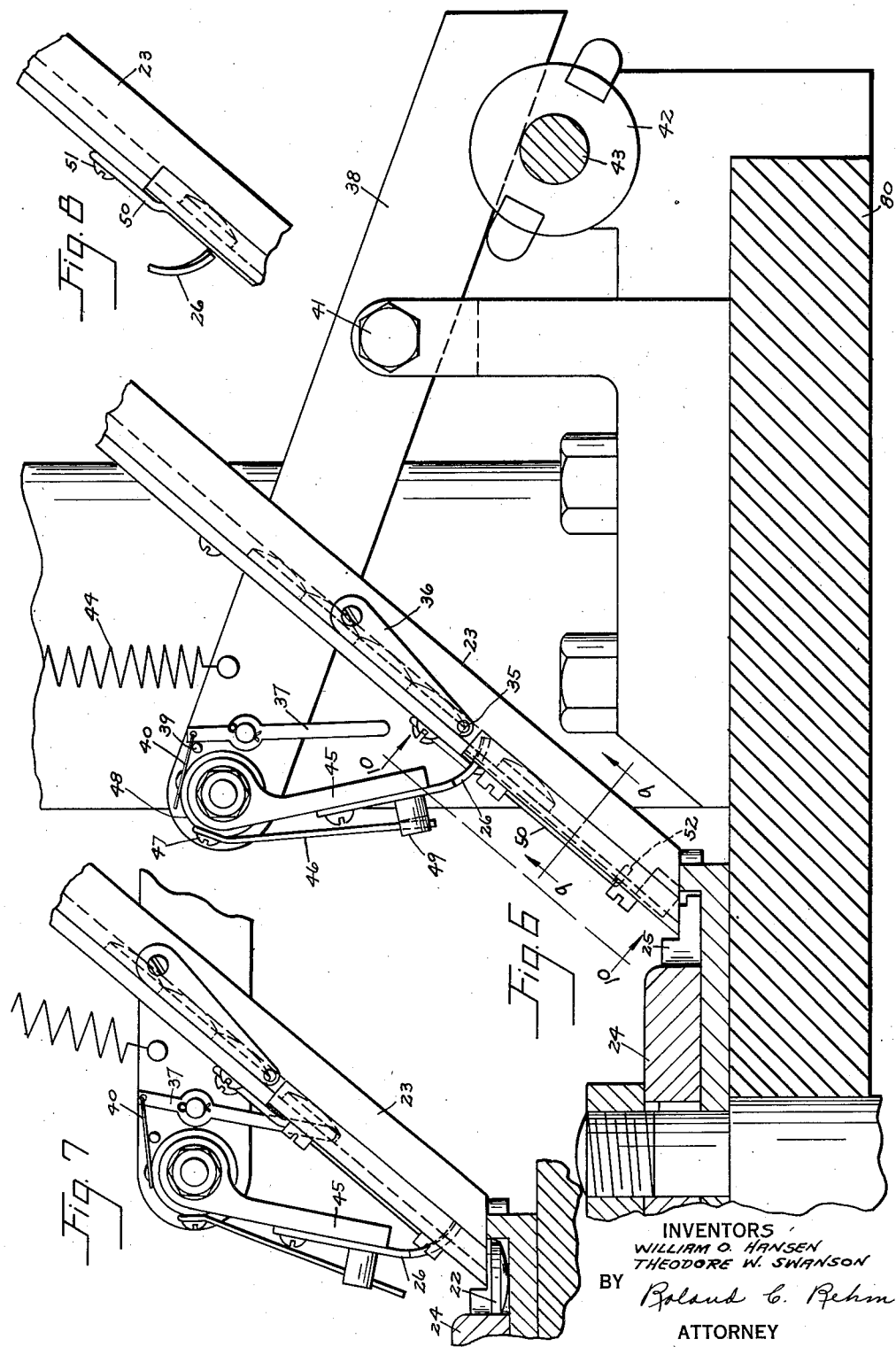

July 7, 1942. W. O. HANSEN ET AL 2,289,267
ASSEMBLY MACHINE FOR FASTENING DEVICES
Filed Aug. 13, 1938 7 Sheets-Sheet 7
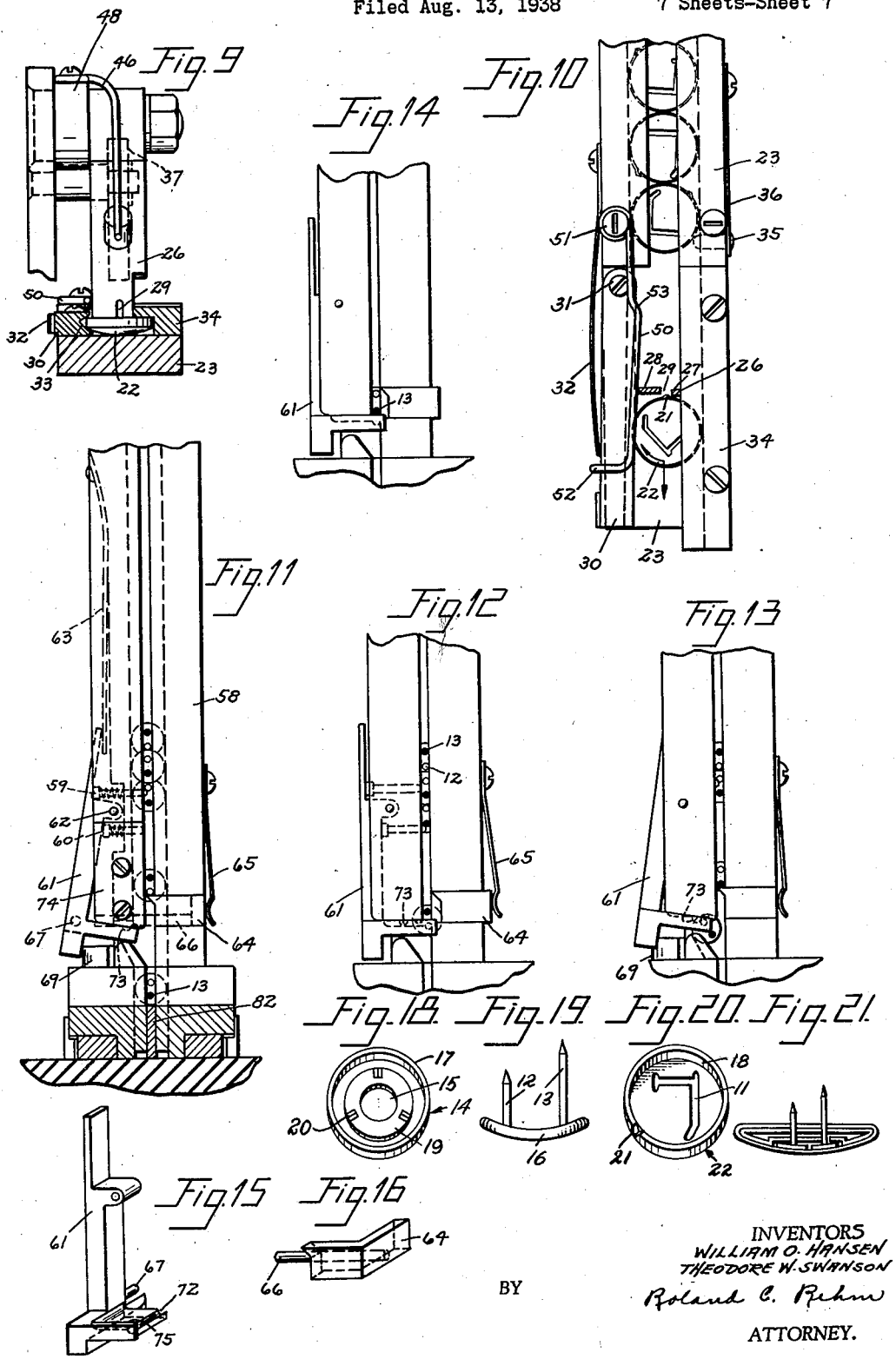
INVENTORS
WILLIAM O. HANSEN
THEODORE W. SWANSON
BY Roland C. Rehm
ATTORNEY.

Patented July 7, 1942

2,289,267

UNITED STATES PATENT OFFICE 2,289,267

ASSEMBLY MACHINE FOR FASTENING DEVICES

William O. Hansen and Theodore W. Swanson, Detroit, Mich., assignors to Universal Button Fastening & Button Company, Detroit, Mich., a corporation of Michigan Application August 13, 1938, Serial No. 224,670

5 Claims. (Cl. 10—158)

This invention relates to the assembly of composite fastening devices such as buttons, fasteners and the like, and among other objects aims to provide a method and apparatus for assembling fastening devices of this character with their elements in predetermined relation.

The nature of the invention may be readily understood by reference to one illustrative apparatus embodying the invention and illustrated in the accompanying drawings.

In said drawings:

Fig. 3 is a fragmentary top plan view on a larger scale;

Fig. 4 is a sectional elevation on a larger scale taken on the plane 4—4 of Fig. 1;

Fig. 5 is a sectional elevation on a larger scale taken on the plane 5—5 of Fig. 1;

Fig. 6 is a sectional elevation on a larger scale taken on the plane 6—6 of Fig. 1;

Fig. 7 is a view similar to that of Fig. 6 illustrating the mechanism at a later point in the cycle of operations;

Fig. 8 is a view similar to Fig. 7, illustrating certain elements in a still later point in the cycle of operations;

Fig. 9 is a transverse section through a raceway taken on the plane 9—9 of Fig. 6;

Fig. 10 is a plan section of the lower portion of the raceway taken from the plane 10—10 of Fig. 6;

Fig. 11 is a sectional elevation taken on the plane 11—11 of Fig. 4, showing a portion of the fastener raceway.

Figs. 12, 13 and 14 are views similar to that of Fig. 11, illustrating the orienting mechanism in different positions;

Figs. 15 and 16 are perspective views of elements of the orienting mechanism;

Fig. 17 is a perspective view of an element for deforming the disc to prevent relative rotation;

Fig. 18 is a perspective view of a disc forming one of the elements of the illustrative fastening device;

Fig. 19 is an elevation of a pronged fastener element;

Fig. 20 is a perspective view of the top of a fastening device; and

Fig. 21 is a sectional view of the assembled fastening device.

Figure 1:
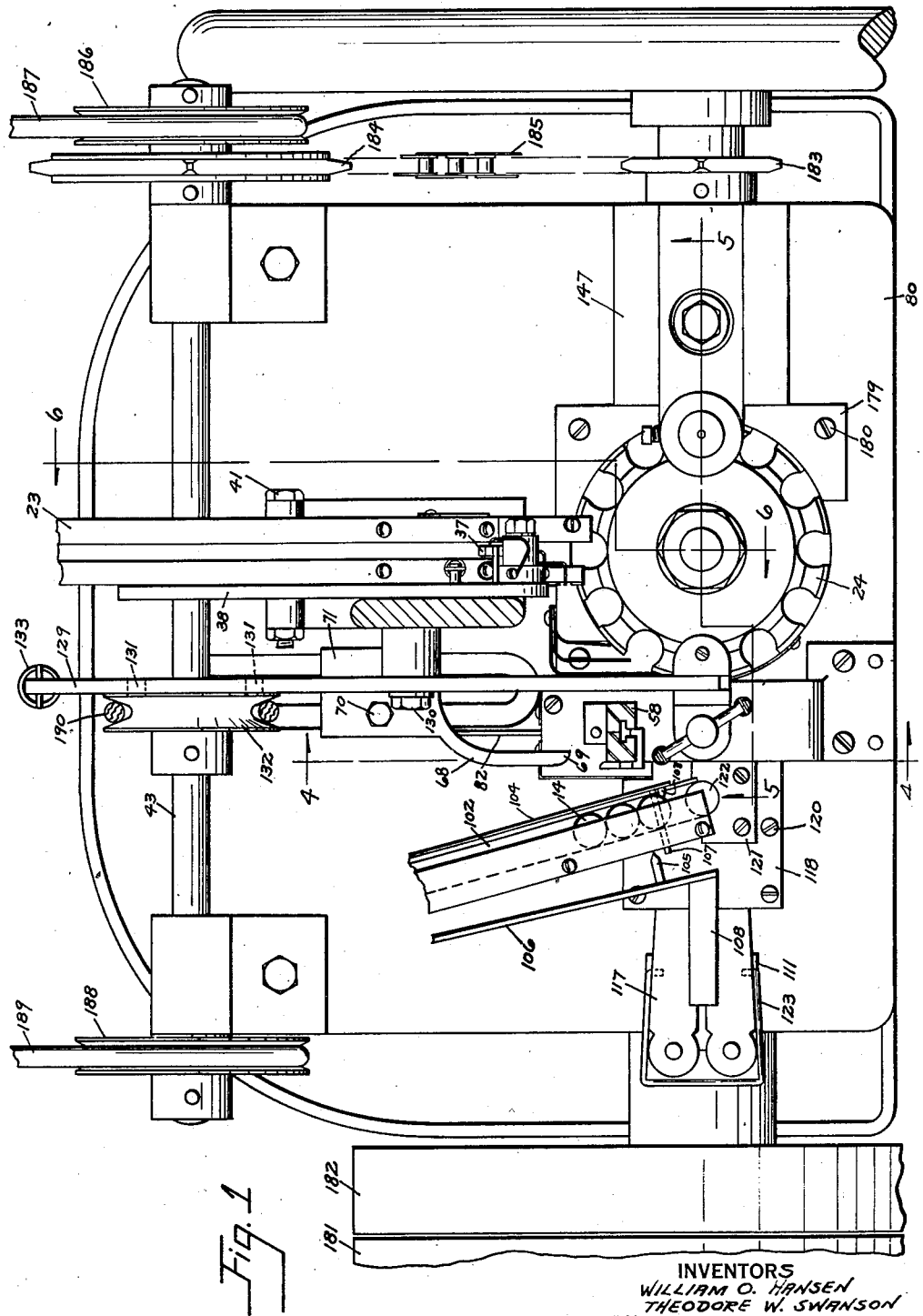
Fig. 1 is a top plan view of the apparatus.

The illustrative fastening device is characterized by a top 22 exhibiting thereon a symbol or design in the form of a trade-mark 11, here represented by the letter "L" embossed or impressed in the sheet metal of which the top is composed. The illustrative apparatus assembles the top on the fastening device in predetermined position to facilitate its attachment to the garment with the trade-mark in upright position.

The fastening device is here represented by a pronged fastener adapted to penetrate the garment and to be upset within and thereby attach an element on the opposite face of the garment. The character of the fastening device to which the top is applied may vary greatly depending upon its function. The fastening device is, in this instance, provided with two prongs 12 and 13, prong 13 being slightly longer than prong 12. The top is assembled on the fastener in a predetermined position relative to the prongs.

To enlarge the effective size of the head or top of the fastener, a disc 14 having a central opening 15 is applied to the head 16 of the fastener to which the top is directly applied, the head 16 lying between the disc and the top. The top carries a rim or skirt 18 adapted to be curled over the disc (see Fig. 21). Preferably the disc 14 is also provided with a skirt 17 to facilitate handling and feeding of the discs. The diameter of the skirt is preferably such as to be a press fit inside the skirt of the top. In completing the assembly of the fastener, both skirts 17 and 18 are simultaneously curled by a curling or crimping die (see Fig. 21). Preferably the opening 15 in the disc is such as to provide a press fit over the prongs 12 and 13. The central portion 19 of the disc is advantageously offset to provide a recess for the fastener head 16. The latter is preferably rounded to conform with the contour of the top. To prevent changing of the predetermined relation of the trade-mark 11 to the plane of the prongs 12 and 13, the central portion 19 of the disc is advantageously indented or prick punched as at 20 to prevent rotation.

The predetermined relation of the fastener prongs to the trade-mark on the top may vary in accordance with the method and means of applying the fastener to the garment. In the present instance, the plane of the prongs is at right angles to the bottom of the design, with the longer prong 13 located adjacent the bottom. In other words, the design is located in an upright position when the fastener prongs lie in a vertical plane with the longer prong lowermost.

To facilitate assembly, the skirt 18 of the top is temporarily distorted or given an irregularity such as an outwardly bent lip 21 having a predetermined relation to the trade-mark. This irregularity is advantageously formed during the process of manufacture of the top and preferably simultaneously with the embossing of the trade-mark or design to insure definite relation between the two. The distortion is preferably of such a character as to be subsequently obliterated; in this instance this occurs upon the curling of the skirt in the assembling operation. The final fastening device, therefore, is without any blemishes or irregularities. For buttons and other types of fastening devices, the relation of the design to the other elements of the button depends upon the character of the button or of the fastening device.

In the illustrative assembling apparatus, tops 22 are delivered to the assembling mechanism with the irregularity or lip 21 in a predetermined position. Thereafter the fasteners (assembled with the disc 14) are deposited in the top with the fastener prongs 12 and 13 in a predetermined relation relative to the irregularity 21 on the top. A compressing operation forces the disc tightly into the top and prevents relative rotational displacement of the parts during the interval preceding curling of the skirt 18 and completion of the assembly. In this instance the irregularity is obliterated simultaneously and with the same die as curls the skirt.

The completed fasteners may then be attached by an appropriate attaching machine which feeds the fasteners with the long and short prongs in predetermined relation to attaching position, thereby insuring attachment to the garment with the trade-mark 11 upright on the garment.

In the illustrative apparatus, the tops 22 are supplied from a conventional rotary hopper (not shown) and discharged into an inclined chute or raceway 23. The discharge openings in the hopper are designed to pass the tops only when the inside is uppermost and the irregularity 21 is either in front or to the rear. When thus discharged, the tops travel by gravity down the raceway.

Means for orienting the tops to bring the irregularity or lip 21 into a predetermined position for assembly are, in this instance, incorporated in the raceway. In oriented position the top is discharged from the raceway into a cyclically operating assembly device, in this instance in the form of a rotating dial 24 provided with notches or slots 25 in its periphery of a size and shape to hold the oriented tops (see Figs. 3 and 6). The function of the assembly device is to receive and carry the fastener elements through the assembly operations, and it may have various forms.

The aforesaid orienting mechanism exerts friction on the advancing tops to rotate the latter and in this instance employs an advancing device in the form of a finger 26 to push the lowermost top through a portion of the raceway designed to rotate the top (in this case in a clockwise direction, see Fig. 10) until the lip 21 arrives at a predetermined position, in this case abutting the portion 27 of finger 26. The extremity of the latter is provided with a slot which separates the portions 28 and 27, the latter being offset inwardly (see Fig. 10) to allow the lip 21 to rotate freely into the notch 29. In the latter position, its rotation is arrested by engagement with the portion 27 of the finger.

To produce the aforesaid rotation of the top during its forward advance, the raceway is provided with a movable rail section 30 pivoted at 31 and pressed against the top by leaf spring 32. The inner face of the rail is given a V-shaped contour 33 adapted to engage the upper and lower edges of the skirt 18 in such a way so as very materially to increase the frictional resistance on the skirt as compared to that of the opposite stationary rail 34 which is advantageously formed of a hardened and highly polished piece of steel to impose relatively little frictional resistance to passage of the top. The differential friction thus applied to the opposite edges of the top by rails 30 and 34 thereby results in a clockwise rotation of the top as it descends in the raceway.

To the rear of the orienting mechanism, the column of tops is brought to rest against a retractible stop pin 35 (an element of the illustrative releasing mechanism) resiliently pressed into the path of the tops by the leaf spring 36. The releasing mechanism is here shown as comprising a pusher 37 (see Fig. 6) pivoted to operating lever 38 and held in the position shown in Fig. 6 against stop pin 39 by a formed wire spring 40. Lever 38 is pivoted at 41 and oscillated by the double-lobed cam 42 mounted on cam shaft 43. On retraction of pusher 37, its extremity enters a top and, on engagement with its skirt on its forward movement, forces the top past the stop pin 35. In this operation the spring 40 allows the pusher to follow the path of the top shown in Fig. 7, and spring 44 connected to lever 38 operates to raise the latter and hold the same in operative relation with cam 42.

Finger 26 is also operated by lever 38, being here shown adjustably connected to a supporting arm 45 pivoted to the extremity of lever 38. A formed wire spring 46 presses finger 26 into the raceway but allows the finger to change its angular position relative to the lever during its travel down the raceway. Spring 46 is anchored at 47 to a hub 48 on lever 38, and its free extremity rests in a slot in stud 49. On return movement of lever 38 finger 26 is appropriately cammed or raised out of the raceway to clear the top previously advanced by finger 37. The camming device is here represented by a wire spring 50 anchored at 51 and lying in the path of the finger 26. The free extremity of the spring is provided with an offset hook 52 to limit the inward movement of the spring. The finger in moving to the rear is cammed up by its engagement with the lower free extremity of the spring and thereby moves on its return travel above the raceway. At the limit of its return it clears the offset 53 in the spring and again returns to the raceway behind the previously released top. On its forward travel the finger displaces the spring 50 and carries a top through the above-described orienting operation and deposits the same in a recess 25 in the dial with the lip 21 located at the periphery of the dial 24.

The dial is rotated step by step (counterclockwise), thereby moving the tops past the extremities of leaf springs 54 and 55 which drag across the face of the skirts 18 and serve to maintain the lips 21 in their predetermined position against the trailing edge of the notches of the dial. As shown in Fig. 3, the notches or slots 25 are so shaped as to prevent rotation of the tops beyond this point. Springs 56 and 57 are curved to bear against the periphery of the dial and maintain a frictional drag on the rims of the tops to hold them in properly adjusted position until initial assembly of the elements has been completed.

The pronged fasteners and their discs are assembled and inserted into the oriented tops in a position about 90° beyond the raceway 23 (see Fig. 3). Mechanism is provided for orienting the fastener prongs to position the longer prong in advance of the shorter prong, in which position the fastener with its assembled disc is moved laterally into a top in receiving position by devices which maintain predetermined location of the fastener prongs.

One form of fastener orienting mechanism is illustrated in Figs. 11 to 16. Fasteners are supplied from a conventional hopper and discharged therefrom into the raceway 58 with one prong in advance of the other. The relation of shorter to longer prong, however, is a random arrangement, in some instances the longer prong is in advance and in others the shorter prong. For convenience in illustration, the longer prong 13 is diagrammatically represented in plan view in the figures as a solid circle (Fig. 3).

The column of fasteners is brought to rest against a spring pressed pin 59. To release one fastener at a time, pin 59 is reciprocated alternately relatively to spring pressed pin 60 separated by approximately the spacing of the fasteners in the raceway. The stop pins are alternately inserted and withdrawn from the raceway by a lever 61 pivoted at 62 between the pins. The upper end of the lever is normally pressed outwardly by leaf spring 63. A complete cycle of oscillation of the lever serves to release a single fastener which falls upon stop gate 64 pressed inwardly by leaf spring 65 and carrying a pin 66 bearing against pin 67 on lever 61 by which the stop is moved outwardly to allow a fastener to fall into the orienting device.

Lever 61 is operated by a reciprocating slide bar 68 having a bevelled cam extremity 69 and connected by screw 70 to a reciprocating slide 71. Forward movement of the bar displaces the lower end of lever 61. Upon return movement of the bar, spring 63 restores the lever to its initial position. Spring 63 is of sufficient strength to overcome the counteracting force of spring 65. The orienting device is in this instance carried by lever 61. It is in the form of a shelf carrying a notch 72 of a length sufficient to receive the shorter leg of the fastener but not long enough to receive the longer leg. If, as illustrated in Figs. 11 and 12, a fastener be released by gate 64 with its shorter leg lowermost, the latter will fall into notch 72. When the lower end of lever 61 is moved outwardly, the shorter prong of the fastener is carried laterally, thus allowing the fastener to rotate in a clockwise direction (see Fig. 13) to bring the longer prong lowermost. Continued outward movement of lever 61 brings the shorter prong in engagement with the projection 73 which ejects the prong from the recess 72. Projection 73 is an integral part of a hardened steel plate 74 adjustably connected to the face of the raceway.

If, as illustrated in Fig. 14, the gate 64 releases the fastener with its longer prong lowermost, the latter rests against a ledge 75 at the end of notch 72 and is prevented thereby from falling into notch 72. The longer prong, therefore, cannot be moved laterally upon retraction of the lower end of lever 61 but is instead stripped from the ledge 75 by engagement with the stationary portion of the raceway and thereupon falls with the longer prong lowermost into the lower portion of the raceway. Thus the fasteners are always presented with the longer prong in leading position.

As here shown, the fastener raceway 58 is formed from two similar halves detachably secured together by screws 76. One of the aforesaid halves carries a foot portion 77 located in proper position by pin 78 (Figs. 3 and 4).

The plate 79 on which the raceway is mounted is slotted to continue the raceway passage, the latter being provided with a right angle curved portion 83 to guide the fastener into a horizontal plane. Plate 79 is detachably secured to the bed 80 of the apparatus by screws 81.

When a fastener is oriented and released as aforesaid, it comes to rest in the lower portion of the raceway passage upon a reciprocating slide 82 (Fig. 4) which eventually retracts, allowing the fastener to slide by gravity down the curved passage 83 to come to rest in front of the slide 82. Slide 82 is adjustably connected to slide 71 (Fig. 4) by a screw 84 and an elongated slot 85. Slide 71 is reciprocated by lever 86 (Figs. 2 and 4) pivoted at 87 and having a portion 88 thereof bearing against operating cam 89 carried on main shaft 90. Spring 91 maintains operative engagement with the cam 89 and serves to operate the slide on its forward stroke, thereby avoiding damage in the event an element becomes jammed.

Upon forward movement of slide 82, the oriented fastener is advanced thereby in vertical registry with a disc with which it is to be assembled. In such position it is grasped by the longer leg in jaws 92 which have a recess therein to grasp the longer leg of the fastener. The jaws are pivoted at 93 (Figs. 3 and 4) to the plate 79 and are resiliently pressed together by springs 94 (Fig. 3). The fastener is thus held in position 95 (Fig. 4) seated on a vertically movable plunger 96 preparatory to assembly with the disc 14.

Plunger 96 is detachably secured by screw 97 to a vertically slidable block whose lower end carries a cam roll 98 held in contact with cam 99 by compression spring 100. Cam 99 is carried on main shaft 90. On elevation by plunger 96, the fastener head cams open jaws 92 by engagement with the conically shaped counterbore 101 thereof (Fig. 5).

The discs may be fed to assembly position by any appropriate feeding mechanism of which that herein illustrated is one form. The discs are supplied to raceway 102 (Figs. 1 and 2) from a hopper (not shown) in which they are promiscuously deposited. The hopper opening is conventionally designed to permit escape of the discs into the raceway only when their skirts 17 are uppermost. The discs gravitate downwardly in the raceway, the lowermost disc being arrested by stop pin 103 carried by spring 104. Cooperating with pin 103 to release one disc at a time is pin 105 carried by an elongated flat spring 106 and spaced longitudinally of the raceway by a distance equivalent approximately to the diameter of the disc. When pin 105 enters the raceway, it retracts pin 103 by engagement with projection 107 releasing the lowermost disc. Pin 105 is retracted by an extension 108 whose offset 109 is engaged by pin 110 carried by slide 111. The latter slide is reciprocated by lever 112 pivoted at 113 to a portion of the machine frame and carrying a cam roll bearing against side face cam 114 on main shaft 90. A spring 116 connected to lever 112 functions to advance slide 111. When the latter is retracted, the pin 103 again enters the raceway. Spring 106 is sufficiently strong to overcome resistance of spring 104 in the aforesaid operation.

After release, the disc gravitates between a pair of horizontally reciprocating fingers 117 representing means for transferring the assembled disc and fastener to an oriented top. The fingers reciprocate within a housing 118 (secured to the bed 89 of the machine by screws 120) to which the lower extremity of raceway 102 is keyed by the member 121. The latter and the housing 118 are provided with an opening 122 through which the discs fall into beveled jaws 128. The latter are pivoted upon slide 111 and are resiliently pressed together by spring 123.

While a fastener is being pressed through the opening in the disc the latter is resiliently held in the jaws by mechanism represented by plunger 124 (Fig. 5). The latter is provided with a pair of bores 125 into which the fastener prongs project, thereby maintaining the orientation of the fastener during this operation. Upon completion of this assembly operation, the fastener and disc are moved laterally into registration with a top in dial 24 into which the disc and fastener are pushed by plunger 126. To effect the aforesaid transfer of the assembled disc and fastener, the fingers 117 are provided with a pair of recesses (Fig. 3) separated by the distance between plungers 124 and 126. The mechanism for operating plunger 124 causes the latter to dwell in its lower position against the disc (Fig. 5) while the fingers are being retracted to permit the disc to be grasped in the forward recess 127 in the fingers. The rear opening in the fingers is bevelled at 128 to provide a cam surface by which the fingers are separated (as the latter are retracted) by the disc while the latter is held by plunger 124. After the plunger has withdrawn, the fingers advance to carry the assembled disc and fastener into registry with the top as aforesaid. In such position the plunger 126 descends and pushes the disc and fastener into the top.

Plungers 124 and 126 are operated in synchronism with plunger 96 and associated mechanism by any appropriate actuating devices. Those here shown are illustrated in Figs. 4 and 5. Power is supplied through a lever 129, pivoted at 130 to a fixed point on the apparatus. The lever is in turn operated by pins 131 projecting from pulley 132 and adapted periodically to elevate the lever. The return movement of the latter is effected by spring 133 (Fig. 1). Pulley 132 is driven from the half-speed shaft 43.

The opposite end of lever 129 is provided with a fork 134 which embraces pin 135 carried in plunger head 136. Plunger 126 is threaded into head 136 and held in adjusted position by a lock nut (Fig. 5). Both plungers 124 and 126 are supported in and guided by bracket 137 secured at 138 to the bed of the machine. Head 136 carries a lateral extension 139 embracing a reduced portion on plunger 124 by means of which the latter is raised. Springs 140 connected to its upper portion 141 serve to effect the downward travel of the plunger. In its lower position, extension 139 is separated a distance 142 from the upper portion 141, thereby effecting a lost motion in the operation of plunger 124 by means of which the latter is permitted to dwell in engagement with the disc 14 during the retraction of fingers 117.

The lower end of plunger 124 is provided with a pair of fastener leg recesses 125 which maintain the fastener legs against displacement during assembly of the fastener with the disc. A pin 143 carried by bracket 137 and traveling in a groove 144 in the plunger (see Fig. 5) serves to prevent the latter from rotating and to maintain the alignment of the bores 125. The lower end of plunger 126 is recessed as at 145 to receive the fastener legs during pressing of the disc into a top (see Fig. 5). Although the plunger 124 has a period of lost motion, the cycles of operation of plungers 124 and 126 are the same. Thus when plunger 124 holds a disc against the upward pressure of plunger 96, plunger 126 simultaneously presses a preceding assembled fastener and disc downwardly from fingers 117 into a subjacent top.

The disc advantageously has a press fit in the top and after it, together with the fastener, has been thus assembled with the top the danger of relative displacement has passed and it is no longer necessary to guard against displacement of the top in the dial 24.

After assembly, as aforesaid, the skirt of the top, and in this instance the skirt of the disc, are curled or crimped inwardly to fasten the disc tightly in place and clamp the fastener head between the disc and the top. In the present instance, the disc is also indented as at 20 to anchor the fastener prongs against relative rotation.

One form of curling mechanism is illustrated in Figs. 1 and 5. A curling die 146 vertically adjustable in block 147 is adapted to curl over the top as aforesaid when the assembly is elevated by plunger 148. The latter is adjustably mounted on slidable block 149 carrying at its lower end a cam roll bearing against cam 150. It is advantageously positively retracted in this instance by a rocking lever 151 whose end 152 engages a shoulder 153 on the block. The lever is pivoted at 154 and its opposite end projects into a recess in slide 155 guided by block 156. The lower end of the slide carries a cam roll 157 which travels on cam 158.

Curling die 146 is adjustably seated against a hollow headed screw 159 threaded into block 147. Inside the screw and the bore of die 146 operates a tool 160 in the form of a sleeve for indenting the disc as at 20 to lock the fastener prongs against relative displacement. The end of the tool in this instance is provided with three sharpened projections 161 for this purpose. Intermediate its ends, it is shouldered as at 162 to provide a seat for spring 163 and to limit the forward travel of the tool. Its inward travel is adjustably limited by a hollow screw 164 threaded inside the screw 159 and adapted to provide a seat for the tool to provide adequate resistance for the indenting operation (Fig. 5). Spring 163 is made sufficiently strong to serve as a means for stripping the finished article from the die on retraction of plunger 148. A rod 165 located inside the bore of the tool is advantageously provided for positively stripping any article which may have become stuck in the die. The spring 166 bearing against a shoulder 167 on the rod serves to assist in the stripping operation. The free end of the rod projects above screw 164 and provides a means by which positive stripping may, if necessary, be effected.

The stripping operation returns the completed fastener to the slot in the dial by which the fastener is ultimately carried into registry with opening 168 in the bed 89 of the machine and through it drops into an appropriate receptacle.

Figure 2:
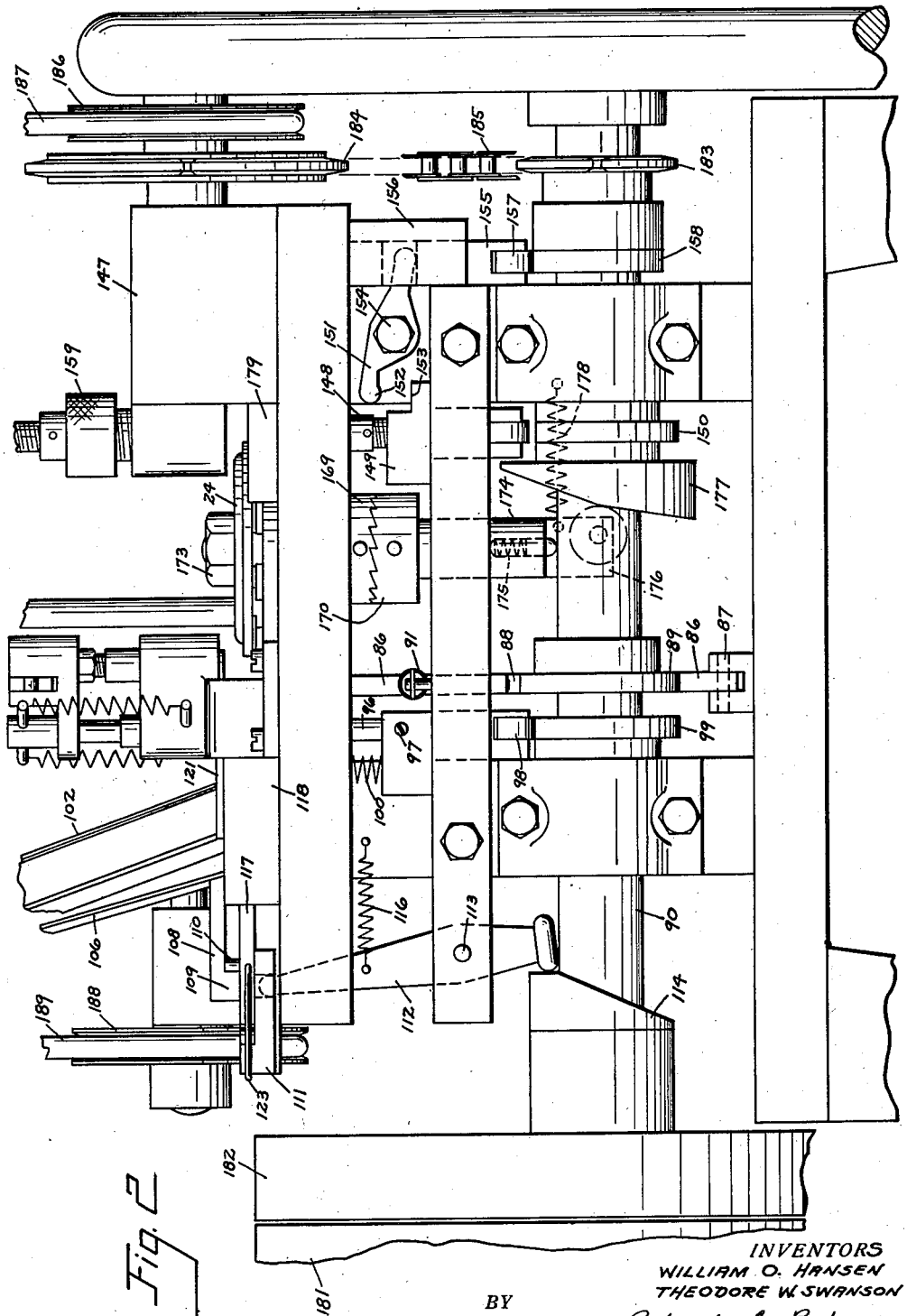
Fig. 2 is a front elevation thereof.

The dial is given a step by step operation by any appropriate means functioning in synchronism with the various operations above described. That here shown is in the form of a ratchet clutch comprising members 169 and 170. The former is secured to stud shaft 171 to which the dial is connected by means of key 172 and nut 173 (Figs. 2 and 5). Lower clutch member 170 is carried on a stub shaft 174, the upper end of which is centered inside the clutch member 169. The clutch member 170 is resiliently pressed into engagement with member 169 by means of a spring 175 seated inside the stub shaft and pressing against a plunger having a rounded end bearing against a fixed support on the apparatus. The shaft is oscillated by a lateral offset 176 carrying a cam roller bearing against a side face operating cam 177 mounted on main shaft 99. Spring 178 connected to the offset portion 176 serves to maintain operative contact with cam 177.

The periodic oscillation thus produced in clutch member 170 serves to advance the dial slot by slot at the proper instant. During the idle oscillation of the clutch member 170, the teeth on the latter are cammed downwardly against the pressure of spring 175.

The dial 24 is vertically aligned relative to fingers 117 by a counter-bored gauge plate 179 (Figs. 1, 2, 3 and 5) secured to bed 80 by screws 180.

Power is supplied by belt to loose and fast pulleys 181 and 182, respectively, on shaft 99. The half-speed shaft 43 is driven from shaft 90 by means of chain sprockets 183 and 184 and chain 185. Pulley 186 and belt 187, driven by the half-speed shaft, drive the hopper for supplying the tops. Pulley 188 and belt 189 similarly drive the hopper for supplying the discs. Pulley 132 and belt 190 drive the hopper for supplying the fasteners.

Obviously the invention is not limited to the details of the illustrative apparatus since these may be variously modified. Moreover, it is not indispensable that all features of the invention be used conjointly since various features may be used to advantage in different combinations and sub-combinations.

Having described our invention, we claim:

1. Apparatus for assembling a headed double pronged fastener with a top and underlying disc comprising in combination a periodically advancing carrier having a recess therein to receive a top with a fastener head and disc therein, a crimping die for crimping the top over the fastener head and disc, means for orienting a top and placing the same in said recess, means for orienting a fastener and placing the same with a disc in said top, and means for operating said carrier to move the fastener top with the fastener and disc therein to said crimping die.

2. In apparatus for assembling fastening devices comprising a pronged element and a sheet metal top therefor carrying a design, the combination comprising means for feeding a sheet metal top carrying a design and having its margin distorted at a point bearing a predetermined relation to the design, mechanism for preliminarily assembling a pronged element and a top, said mechanism having a device for engaging the distorted margin of the top to place the top in predetermined position in relation to the pronged element, and means for attaching the top to the pronged element and for obliterating said distortion.

3. In apparatus for capping fastening devices and the like with a symmetrical cap having a predetermined relation to the fastening device, the combination comprising means for feeding a sheet metal cap carrying a design and having a portion of the cap temporarily distorted at a point bearing a predetermined relation to said design, mechanism for engaging said distortion to orient the cap for assembly with the fastening device, and mechanism for completing the assembly including means for obliterating said distortion.

4. In apparatus for assembling a sheet metal cap having a design thereon and a double pronged fastener having one prong longer than the other, the combination comprising mechanism for crimping the cap over the head of the fastener, means for feeding a fastener to said mechanism, means for feeding a cap to said mechanism, and means for rotating the cap relative to the prongs of said fastener until the design on the cap occupies a predetermined relation to the prongs.

5. Apparatus for applying to a double pronged tack a sheet metal top carrying a design comprising in combination mechanism for affixing a top to a pronged tack, means for feeding a tack to said mechanism, means for feeding a top to said mechanism, and devices for rotating the top in relation to the position of the tack prongs so that when the top and tack are assembled the design on the top will have a predetermined relation to the prongs of said tack.

WILLIAM O. HANSEN.
THEODORE W. SWANSON.